US011947656B2

(12) United States Patent
Finchelstein et al.

(10) Patent No.: US 11,947,656 B2
(45) Date of Patent: Apr. 2, 2024

(54) PROOFING AGAINST TAMPERING WITH A COMPUTER

(71) Applicant: KAZUAR ADVANCED TECHNOLOGIES LTD., Tel-Aviv (IL)

(72) Inventors: Daniel Mondy Finchelstein, Rishon Lezion (IL); Yuval Moshe Porat, Tel Aviv-Jaffa (IL); Be'eri Berl Katznelson, Kiryat Tiv'on (IL); Yaacov Fenster, Petach Tikvah (IL)

(73) Assignee: KAZUAR ADVANCED TECHNOLOGIES LTD., Tel-Aviv (IL)

( * ) Notice: Subject to any disclaimer, the term of this patent is extended or adjusted under 35 U.S.C. 154(b) by 0 days.

(21) Appl. No.: 17/041,173

(22) PCT Filed: Mar. 26, 2019

(86) PCT No.: PCT/IL2019/050346
§ 371 (c)(1),
(2) Date: Sep. 24, 2020

(87) PCT Pub. No.: WO2019/186549
PCT Pub. Date: Oct. 3, 2019

(65) Prior Publication Data
US 2021/0012037 A1 Jan. 14, 2021

(30) Foreign Application Priority Data
Mar. 26, 2018 (IL) .......................................... 258371

(51) Int. Cl.
*G06F 21/45* (2013.01)
*G06F 18/22* (2023.01)
(Continued)

(52) U.S. Cl.
CPC .............. *G06F 21/45* (2013.01); *G06F 18/22* (2023.01); *G06F 21/31* (2013.01); *G06F 21/602* (2013.01); *G06F 21/64* (2013.01); *G06F 21/86* (2013.01)

(58) Field of Classification Search
None
See application file for complete search history.

(56) References Cited

U.S. PATENT DOCUMENTS 5,912,612 A 6/1999 Devolpi et al.
6,218,941 B1 * 4/2001 Cromer ................... G06F 21/87
340/568.4

(Continued)

FOREIGN PATENT DOCUMENTS

EP 2426616 A1 3/2012
JP 2003186752 A 7/2003

*Primary Examiner* — Benjamin E Lanier
*Assistant Examiner* — Felicia Farrow
(74) *Attorney, Agent, or Firm* — Browdy and Neimark, PLLC (57) ABSTRACT

A technique of proofing against tampering with a computer including a chassis with a plurality of fasteners. The technique includes obtaining by the computer data indicative of a sequence of implication events associated with the fasteners of the plurality of fasteners, generating a pattern corresponding to the sequence of implication events, matching between data corresponding to the generated pattern and a reference data, and initiating one or more anti-tampering actions responsive to a mismatching result. The method can further include generating a cryptographic signature corresponding to the generated pattern, wherein matching between data corresponding to the generated pattern and the reference data includes matching the generated cryptographic signature to a cryptographic reference corresponding to the reference data. Alternatively, or additionally, the (Continued)

generated cryptographic signature can be usable for secure access to information stored on the computer.

25 Claims, 4 Drawing Sheets

(51) Int. Cl.
*G06F 21/31* (2013.01)
*G06F 21/60* (2013.01)
*G06F 21/64* (2013.01)
*G06F 21/86* (2013.01)

(56) References Cited

U.S. PATENT DOCUMENTS

| | | | |
|---|---|---|---|
| 9,740,888 B1* | 8/2017 | Aga | G06F 21/86 |
| 10,579,833 B1* | 3/2020 | Cook | G06F 21/86 |
| 2003/0084285 A1 | 5/2003 | Cromer et al. | |
| 2004/0150958 A1 | 8/2004 | Calhoon | |
| 2005/0039040 A1 | 2/2005 | Ransom et al. | |
| 2006/0218176 A1* | 9/2006 | Sun Hsu | G06F 16/2246 |
| | | | 707/999.102 |
| 2008/0132118 A1 | 6/2008 | Dalzell et al. | |
| 2011/0031985 A1* | 2/2011 | Johnson | H05K 1/0275 |
| | | | 324/681 |
| 2012/0278579 A1 | 11/2012 | Goss | |
| 2014/0077928 A1* | 3/2014 | Markel | G09F 3/0329 |
| | | | 340/5.8 |
| 2016/0026810 A1 | 1/2016 | Hagiwara et al. | |
| 2016/0283151 A1 | 9/2016 | Chinnakkonda Vidyapoornachary | |
| 2016/0359636 A1 | 12/2016 | Kreft | |
| 2017/0181274 A1 | 6/2017 | Brodsky et al. | |
| 2019/0205574 A1* | 7/2019 | Lu | G06F 1/189 |

\* cited by examiner

PROOFING AGAINST TAMPERING WITH A COMPUTER

TECHNICAL FIELD

The presently disclosed subject matter relates to methods and systems enabling information security, and, more particularly, to methods and systems of tamper proofing.

BACKGROUND

Information security requires preventing unauthorized access or modification, whilst ensuring convenient and easy access to information by authorized users. Securing physical access is one of the important information security tasks, because if a person has physical access to a device, there is almost always a way to take control of it or to extract data out of it. Another important information security tasks is securing against data tampering, i.e. deliberately modifying (destroying, manipulating, editing, etc.) data through unauthorized channels. Unless specifically stated otherwise, it is appreciated that, throughout this patent specification, the term "tampering with computer" should be expansively construed to cover any kind of an act of accessing and/or modifying the computer's hardware, firmware, software and/or data therein. Tamper proofing solutions are aimed to prevent unauthorized alteration to computing devices or the theft of data.

Problems of tamper-proofing computing devices have been recognized in the conventional art and various techniques have been developed to provide solutions, for example:

US Patent Application No. 2008/0132118 discloses a secure connector which comprises a casing; a tamper sensor is disposed inside the casing and is configured to detect unauthorized tamper events; and one or more conductors configured to carry signals, the one or more conductors passing through the tamper sensor. US Patent Application No. 2012/0278579 discloses a method and apparatus for self-initiated secure erasure of data from a non-volatile memory, such as a solid state drive (SSD). In accordance with various embodiments, the memory is operated in communication with a host device. A self-initiated, non-destructive secure erasure of the data stored in the memory is carried out responsive to a detection of an unauthorized power down event associated with the memory.

US Patent Application No. 2016/0283151 discloses a memory module connected to a memory module connector. The memory module receives the connector ID from the connector and communicates, to the connector, a memory module ID associated with the memory module. A connector-module ID token is generated using the connector ID and the memory module ID. It is determined that the connector-module ID token was not received from the connector within a predetermined time window. Data on the memory module is erased in response to not receiving the connector-module ID.

US Patent Application No. 2016/0026810 discloses a portable computer capable of protecting an encryption key that is sent out to a disk drive after a pre-boot process has ended. The portable computer includes a disk drive for encrypting a volume as a whole, and for decoding data at the volume in response to a receipt of an encryption key from a system. The portable computer also includes a key transfer mechanism, a tamper detection mechanism and a protecting mechanism. In response to a boot process starting from a power-off state, the key transfer mechanism automatically sends the encryption key to the disk drive. The tamper detection mechanism detects a physical tampering of the disk drive. In response to a detection of a physical tampering by the tamper detection mechanism, the protecting mechanism prevents an operation of automatically sending the encryption key to the disk drive by the key transfer mechanism.

US Patent Application No. 2017/0181274 discloses tamper-respondent assemblies and fabrication methods which incorporate enclosure to circuit board protection. The tamper-respondent assemblies include a circuit board, and an electronic enclosure mounted to the circuit board and facilitating enclosing at least one electronic component within a secure volume. A tamper-respondent electronic circuit structure facilitates defining the secure volume, and the tamper-respondent electronic circuit structure includes a tamper-respondent circuit. An adhesive is provided to secure, in part, the electronic enclosure to the circuit board. The adhesive is in contact with, at least in part, the tamper-respondent circuit, so that an attempted separation of the electronic enclosure from the circuit board causes the adhesive to break the tamper-respondent circuit, facilitating detection of the separation by a monitor circuit of the tamper-respondent electronic circuit structure.

The references cited above teach background information that may be applicable to the presently disclosed subject matter. Therefore the full contents of these publications are incorporated by reference herein where appropriate for appropriate teachings of additional or alternative details, features and/or technical background.

GENERAL DESCRIPTION

In accordance with certain aspects of the presently disclosed subject matter, there is provided a method of proofing against a physical tampering with a computer comprising a chassis with a plurality of fasteners. The method comprises: obtaining by the computer data indicative of a sequence of implication events associated with the fasteners of the plurality of fasteners; generating a pattern corresponding to the sequence of implication events; matching between data corresponding to the generated pattern and a reference data; and initiating one or more anti-tampering actions responsive to a mismatching result. The method can further comprise generating a cryptographic signature corresponding to the generated pattern, wherein matching between data corresponding to the generated pattern and the reference data comprises matching the generated cryptographic signature to a cryptographic reference corresponding to a reference pattern.

In accordance with other aspects of the presently disclosed subject matter, there is provided a method of proofing against tampering with a computer comprising a chassis with a plurality of fasteners, the method comprising: obtaining by the computer data indicative of a sequence of implication events associated with the fasteners of the plurality of fasteners; generating a cryptographic signature corresponding to the sequence of implication events and using the generated cryptographic signature to proof against tampering with the computer. The generated cryptographic signature can be used for secure access to information stored on the computer. Alternatively or additionally, using the generated cryptographic signature can comprise: matching the generated cryptographic signature to a cryptographic reference; and initiating one or more anti-tampering actions responsive to a mismatching result.

In accordance with other aspects of the presently disclosed subject matter, there is provided a computer comprising a chassis with a plurality of fasteners, a plurality of sensors operatively connected to the fasteners and a security circuitry. Each given fastener of the plurality of fasteners is associated with a sensor of the plurality of sensors, the sensor configured to enable detecting a condition of the given fastener and to forward data indicative of the conditions and/or changes thereof to the security circuitry. The security circuitry is configured to: use data received from the sensors of the plurality of sensors to obtain data indicative of a sequence of implication events associated with the fasteners of the plurality of fasteners; generate a pattern corresponding to the sequence of implication events: match between data corresponding to the generated pattern and a reference data: and initiate one or more anti-tampering actions responsive to a mismatching result.

In accordance with other aspects of the presently disclosed subject matter, there is provided a computer comprising a chassis with a plurality of fasteners, a plurality of sensors operatively connected to the fasteners and a security circuitry, wherein each given fastener of the plurality of fasteners is associated with a sensor of the plurality of sensors, the sensor configured to enable detecting a condition of the given fastener and to forward data indicative of the conditions and/or changes thereof to the security circuitry. The security circuitry is configured to: obtain data indicative of a sequence of implication events associated with the fasteners of the plurality of fasteners; generate a cryptographic signature corresponding to the sequence of implication events; and use the generated cryptographic signature to proof against tampering with the computer.

In accordance with other aspects of the presently disclosed subject matter, there is provided a security circuitry configured to operate in conjunction with a computer comprising a chassis with a plurality of fasteners and a plurality of sensors, each given fastener of the plurality of fasteners associated with a sensor of the plurality of sensors, the sensor configured to enable detecting a condition of the given fastener and to forward data indicative of the conditions and/or changes thereof to the security circuitry. The security circuitry is configured to: use data received from the sensors of the plurality of sensors to obtain data indicative of a sequence of implication events associated with the fasteners of the plurality of fasteners; generate a pattern corresponding to the sequence of implication events; match between data corresponding to the generated pattern and a reference data; and initiate one or more anti-tampering actions responsive to a mismatching result.

In accordance with further aspects of the presently disclosed subject matter, and, optionally, in combination with other aspects of the presently disclosed subject matter, the one or more anti-tampering actions can be selected from a group consisting of: providing a sound alert; sending alert to a dedicated entity; initiating a request for a user's authorization; providing data destructing operations resulting in encrypting at least part of data stored in the computer: providing data destructing operations resulting in erasing at least part of data stored in the computer; providing data destructing operations resulting in destroying encryption keys stored in the computer; providing hardware destructing operations (e.g. sending a high current to disk, etc.). Optionally, the one or more anti-tampering actions can be selected depending on a number of properly removed fasteners prior to an identified mismatch.

In accordance with further aspects and, optionally, in combination with other aspects of the presently disclosed subject matter, each fastener of the plurality of fasteners can be associated with a value, and the pattern can be generated as a string of values corresponding to the sequence of implication events associated with the respective fasteners.

In accordance with further aspects of the presently disclosed subject matter, and, optionally, in combination with other aspects of the presently disclosed subject matter, at least two fasteners and implication events associated therewith can be defined as being equivalent, and the sequences with exchanged places of equivalent implication events can be defined as belonging to the same pattern with equivalent fasteners associated with equal values.

In accordance with further aspects of the presently disclosed subject matter, and, optionally, in combination with other aspects of the presently disclosed subject matter, the cryptographic signature can be generated by applying a hash function to the generated pattern and the cryptographic reference is generated by applying the same hash function to a reference pattern pre-defined for the computer; wherein matching therebetween can comprise comparing the resulting cryptographic signature and the cryptographic reference.

In accordance with further aspects of the presently disclosed subject matter, and, optionally, in combination with other aspects of the presently disclosed subject matter, matching the generated cryptographic signature to the cryptographic reference can comprise using the cryptographic signature as a key for decoding a ciphertext stored in the computer, wherein the matching is considered as successful when a result of decoding corresponds to a predefined unique ID associated with the computer.

In accordance with further aspects of the presently disclosed subject matter, and, optionally, in combination with other aspects of the presently disclosed subject matter, matching between data corresponding to the generated pattern and the reference data can be initiated responsive to a first implication event or other predefined number of occurred implication events.

Among advantages of certain embodiments of the presently disclosed subject matter is enabling authorized opening of the computer's chassis by removing the fasteners in a proper order, whilst preventing data theft and/or alteration in case of unauthorized violation due to improper order of removing the respective fasteners.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "comparing", "generating", "matching", "initiating", "obtaining" or the like, refer to the action(s) and/or process(es) of a computer that manipulates and/or transforms data into other data, said data represented as physical, such as electronic, quantities and/or said data representing the physical objects. The term "computer" should be expansively construed to cover any kind of hardware-based electronic circuitry with data processing capabilities including, by way of non-limiting example, the tamper-proofed computer, the security module and processing circuitry therein disclosed in the present application.

The terms "non-transitory memory" and "non-transitory storage medium" used herein should be expansively construed to cover any volatile or non-volatile computer memory suitable to the presently disclosed subject matter.

The term "criterion" used in this patent specification should be expansively construed to include any compound criterion, including, for example, several criteria and/or their logical combinations.

The operations in accordance with the teachings herein may be performed by a computer specially constructed for the desired purposes or by a general-purpose computer specially configured for the desired purpose by a computer program stored in a non-transitory computer-readable storage medium.

Figures 1A, 1B:
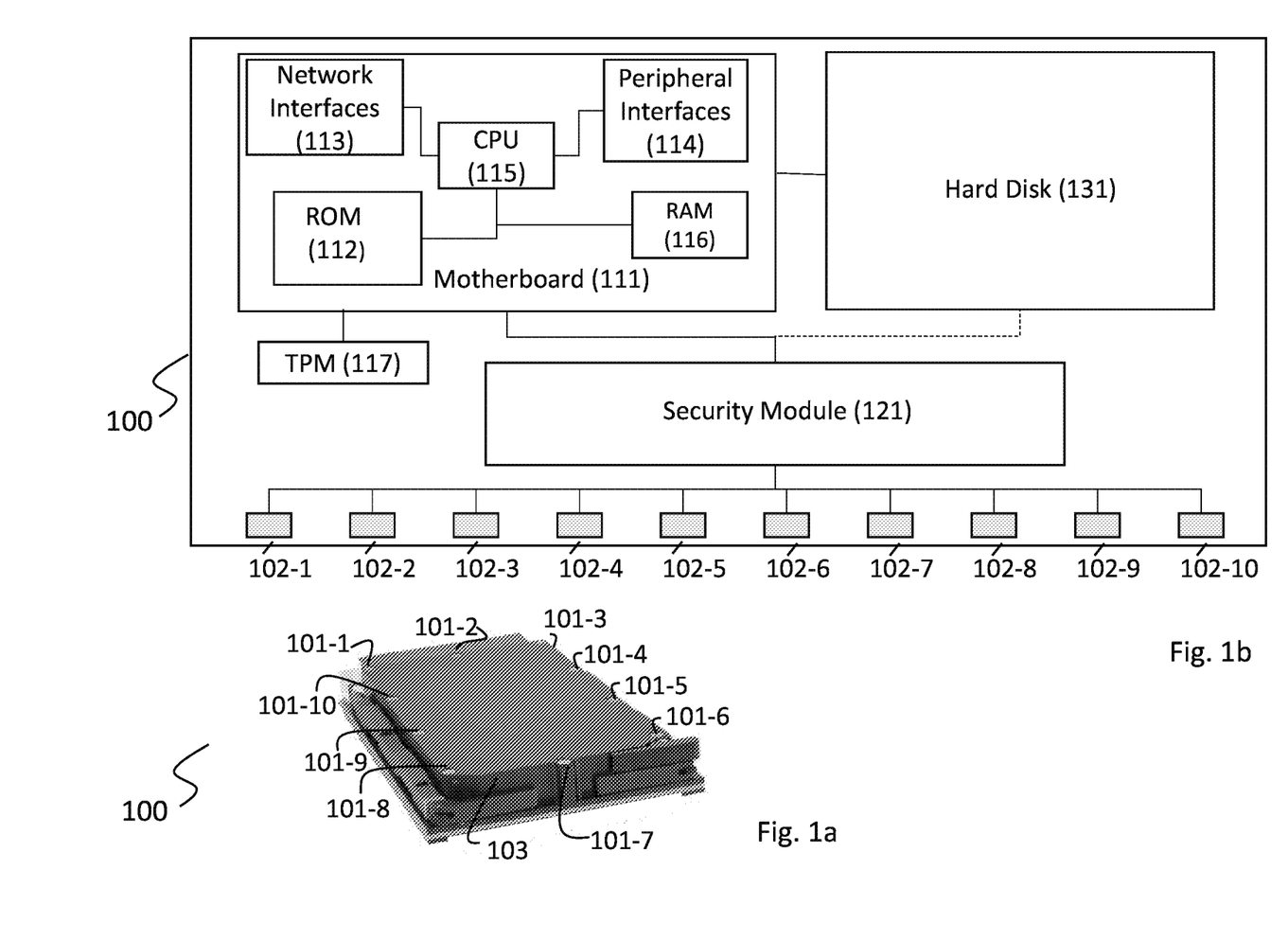
FIG. 1a illustrates an exemplified chassis of a computer and a plurality of fasteners therein.
FIG. 1b illustrates a generalized block diagram of a tamper-proofed computer in accordance with certain embodiments of the presently disclosed subject matter.

Bearing this in mind, attention is drawn to FIG. 1a illustrating an exemplified chassis of a computer and a plurality of fasteners therein.

The term "fastener" used herein should be expansively construed to cover any hardware device (screws, bolts, pins, etc.) usable for mechanically joining two or more components of a computer's chassis.

The chassis 103 illustrated in FIG. 1a comprises a plurality of fasteners (denoted 101-1-101-10). The fasteners create a non-permanent joint that can be removed or dismantled without damaging the joining components. It is desirable to enable authorized opening of the chassis (e.g. panels or parts thereof, mountings for interior components, etc.) by removing the respective fasteners, whilst preventing unauthorized violation of the chassis' structural integrity.

Referring to FIG. 1b, there is illustrated a generalized block diagram of a tamper-proofed computer configured in accordance with certain embodiments of the presently disclosed subject matter.

The illustrated tamper-proofed computer 100 comprises a motherboard 111 operatively connected to one or more hard disks 131 configured to store data. Motherboard 111 comprises one or more CPUs 115 operatively connected to Read-Only-Memory (ROM) 112, Random-Access-Memory (RAM) 116, network interfaces 113 and peripheral interfaces 114. Motherboard 111 can be further operatively connected to Trusted Platform Module (TPM) 117 configured to store cryptographic keys usable for operating the computer. Optionally, TPM 117 can be co-located on the motherboard 111.

In accordance with certain embodiments of the presently disclosed subject matter, the computer further comprises a security circuitry (referred to hereinafter as security module) 121 operatively connected to the motherboard 111 and a plurality of sensors denoted as 102-1-102-10. Optionally, security module 121 can be directly connected to hard disk 131, wireless output (not shown) and/or peripheral modules (not shown). It is noted that security module 121 can be connected to another board (not shown) instead of connecting to motherboard 111. The other board can comprise battery and CPU and can be configured to enable deleting data stored in TPM 117.

The plurality of sensors 102-1-102-10 is configured to enable detecting the condition of each fastener of the plurality of fasteners 101-1-101-10 and to forward data indicative of such conditions and/or changes thereof to security module 121. Optionally, each sensor in the plurality of sensors constitutes a pair with a respective fastener. By way of non-limiting example, sensors 102-1-102-10 can be pressure sensors, resistance sensors, on/off buttons, electromechanical sensors, magnetic sensors, or any other types of sensors appropriate to detect the condition (and/or changes thereof) of the respective fasteners. It is noted that, optionally, a single sensor can be configured to detect the condition (and/or changes thereof) of each of several fasteners associated thereof. It is further noted that the plurality of sensors can include sensors of different types, capable of detecting the same or different conditions of respective fastener(s).

In certain embodiments, the condition of a given fastener can be indicative of a degree of its removal. In other embodiments, the condition can be indicative of a binary state of a fastener (e.g. touched/untouched or removed/not removed). A fastener with detected changes of condition meeting a predefined criterion is referred to hereinafter as an "implicated fastener" and an event of such changes is referred to hereinafter as an "implication event". By way of non-limiting example, for a given fastener the criterion can be met when a degree of removal exceeds a predefined threshold or, alternatively, a degree of removal is less than the predefined threshold; likewise, in the case of a binary state, when the fastener is removed/touched or, alternatively, left/untouched, etc. Optionally, several criteria can be predefined for the same given fastener, and, accordingly, the changes can result in several implication events (e.g. an event of removal exceeding a predefined threshold and an event of total removing the given fastener, etc.). Optionally, different fasteners can have different predefined criteria of implication.

A sensor can be configured to constantly monitor the condition of a given fastener and constantly forward to security module 121 data informative of the monitored condition. Security module 121 can process the received data to detect the changes in condition of the given fastener. Alternatively, the sensor can be configured to detect changes in the monitored condition and, responsive to the detected changes, forward to security module 121 an indication of the changes. Optionally, the sensor can forward data to the security module only if the detected changes meet a predefined criteria (i.e. in a case of an implication event).

The conditions (and/or changes thereof) to be detected and/or forwarded by the sensors can be defined for all fasteners in the same way, or differently. By way of non-limiting example, for certain fasteners the sensors can be configured to detect and/or forward data indicative of the degree of removing such fasteners, while for other fasteners the respective sensors can be defined to detect and/or forward only data indicative of full removal of respective fasteners.

It is noted that in certain embodiments the plurality of fasteners with monitored conditions and/or changes thereof can be configurable, and can comprise only part of all fasteners in the chassis.

Security model 121 is configured to obtain data indicative of implication events and to associate implication events with respectively implicated fasteners. Such association can be provided by any appropriate technique. By way of non-limiting example, the security module can be configured to comprise a plurality of input ports, each port corresponding to a sensor representing a predefined fastener. In such a case, the association between implication events and implicated fasteners can be provided in accordance with the port IDs. By way of another non-limiting example, sensors can forward data with assigned sensors' IDs usable for the required association.

Security module 121 is further configured to identify a sequence of implicating the fasteners. By way of non-limiting example, each implication event (associated with a respective implicated fastener) can be configured to bear a time stamp provided by security module 121 or by a respective sensor. By way of another non-limiting example, security module can handle data indicative of implication events and respectively associated implicated fasteners in a data queue corresponding to the sequence of the implication events.

Security module 121 and operation thereof are further detailed with reference to FIGS. 2-3.

It is noted that the teachings of the presently disclosed subject matter are not bound by the computer system described with reference to FIGS. 1a and b. Equivalent and/or modified functionality can be consolidated or divided in another manner and can be implemented in any appropriate combination of software with firmware and/or hardware and executed on a suitable device. Computer 100 can be a portable computer, smartphone, desktop computer or any other device having a circuitry with processing and memory capabilities.

Figure 2A:
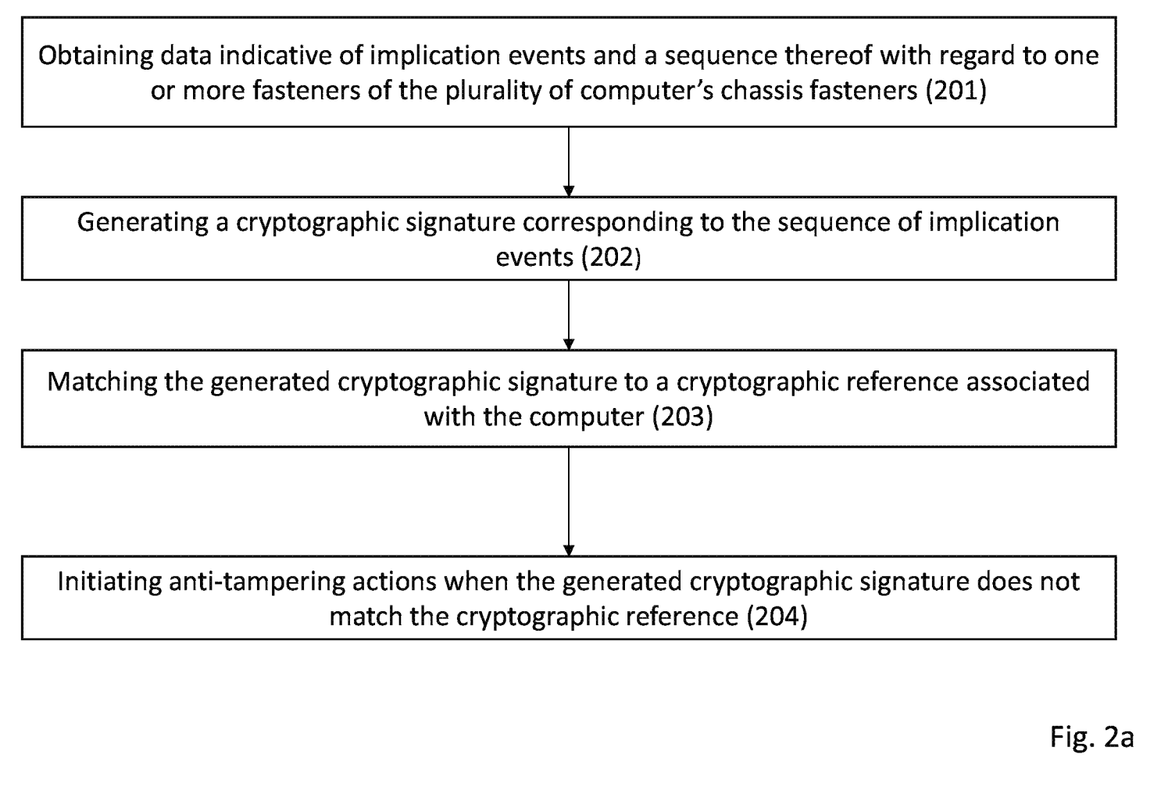
FIG. 2a illustrates a generalized flow-chart of operating a tamper-proofed computer in accordance with certain embodiments of the presently disclosed subject matter.

Referring to FIG. 2a, there is illustrated a generalized flow-chart of operating the tamper-proofed computer 100 in accordance with certain embodiments of the presently disclosed subject matter.

As detailed above, security module 121 obtains (201) data indicative of implication events associated with the fasteners and of the sequence of such events. Responsive to obtaining these data, the security module generates a pattern corresponding to the sequence of implication events. It is noted that the sequence of implication events can include all implication events happened with all implicated fasteners of the plurality of fasteners. Alternatively, the sequence of implication events can include merely implication events (or certain types thereof) happened with pre-configured fasteners and/or happened during a time period with a predefined duration.

Each fastener can be associated with a unique value, and the generated pattern can be presented as a string of values corresponding to the sequence of implication events. Optionally, some of the fasteners (and respective implication events) can be defined as being equivalent. In such a case, the sequences with exchanged places of equivalent events belong to the same pattern with equivalent fasteners associated with the equal values. Optionally, a fastener can be associated with several unique values corresponding to different implication events happened with the given fastener (e.g. an event of removal exceeding a predefined threshold and a later event of total removing the given fastener, etc.). The respective implication events for such fastener can be represented by several unique values (not necessary consecutive if implication event(s) with another fastener happened therebetween) in the string.

Security module 121 further generates (202) a cryptographic signature corresponding to the sequence of the implication events (e.g. to the generated pattern), and matches (203) the generated cryptographic signature to a cryptographic reference (e.g. corresponding to a reference pattern).

The following description is provided for matching between cryptographic signature and a cryptographic reference. Those skilled in the art will readily appreciate that certain teachings of the presently disclosed subject matter are, likewise, applicable to decisions based on matching between the generated pattern and a reference pattern.

Cryptographic signature corresponding to the generated pattern and matching the cryptographic signature to the cryptographic reference can be provided by any appropriate technique, many of them known in the art.

By way of non-limiting example, the cryptographic signature can be generated by applying a hash function to the generated string of values and the cryptographic reference can be generated by applying the same hash function to a reference pattern pre-defined for the computer 100. In such a case, matching comprises comparing the resulting cryptographic signature and cryptographic reference. Optionally, the cryptographic reference and the hash function can be pre-defined and stored in the security module. Alternatively, the reference pattern can be stored in computer 100 (e.g. in the security module, but not necessary so), and security module 121 can be configured to randomly select a hash function to be applied to the generated pattern and the stored reference pattern. It is noted that the teachings of the presently disclosed subject matter are, likewise, applicable to other transformation functions suitable for cryptographic purposes.

By way of another non-limiting example, security module 121 can use the cryptographic signature as a key for decoding a reference ciphertext stored therein. The matching can be considered as successful when the result of decoding corresponds to a predefined unique ID associated with the computer 100 (e.g. respective manufactural number).

Optionally, at least part of data usable for generating the cryptographic reference and/or matching to the cryptographic reference can be updated (e.g. periodically or responsive to predefined events) from a remote source and/or based on a predefined policy stored in computer 100.

When the generated cryptographic signature does not match the cryptographic reference, security module 121 initiates (204) anti-tampering actions thereby securing computer 100 against physical tampering.

It is noted that in certain embodiments the operations (203)-(204) can be initiated responsive to a first implication event. Alternatively, the operations (203)-(204) can be initiated responsive to a predefined number of occurred implication events (e.g. after removing 25% of the fasteners, responsive to removing the last fastener, etc.). The operations (203)-(204) can be further repeated responsive to a predefined number of next occurred implication events (e.g. responsive to each new implication event with regard to each next fastener).

For purpose of illustration only, the above examples of patterns are provided for embodiments when fasteners' conditions are changed from "non-removed" to "removed". Those skilled in the art will readily appreciate that the teachings of the presently disclosed subject matter are, likewise, applicable to more complicated sequences of implication events, including corrections of improper changes and multiple implication events required for removing a certain fastener.

Anti-tampering actions can include sound alerts and/or alerts sent to, covert or uncover, dedicated entities/persons (e.g. via the motherboard and/or directly via a wireless output).

Alternatively or additionally, anti-tampering actions can include data destructing operations resulting in erasing or encrypting data or predefined parts thereof (e.g. data related to predefined application, data stored in predefined volumes, etc.). Data destructing operations can also include destroying encryption keys (e.g. stored in TPM 117), overwriting stored data with new data, etc.

Alternatively or additionally, anti-tampering actions can include hardware destructing operations (e.g. sending a high current to disk, etc.).

Optionally, security module 121 can be configured to initiate different anti-tampering actions depending (optionally in an hierarchical manner) on a number of properly removed fasteners prior to the identified mismatch. By way of non-limiting example, when mismatch is identified responsive to the first removed fastener, security module 121 can initiate a request for a user's authorization and, after successful authorization, can prompt what is the proper first fastener. In a case of unsuccessful authorization or a repeating mismatch, security module 121 can initiate an alarm. If a mismatch is identified when the chassis is about to be opened, security module 121 can initiate data destructing operations or hardware destructing operations.

Figure 2B:
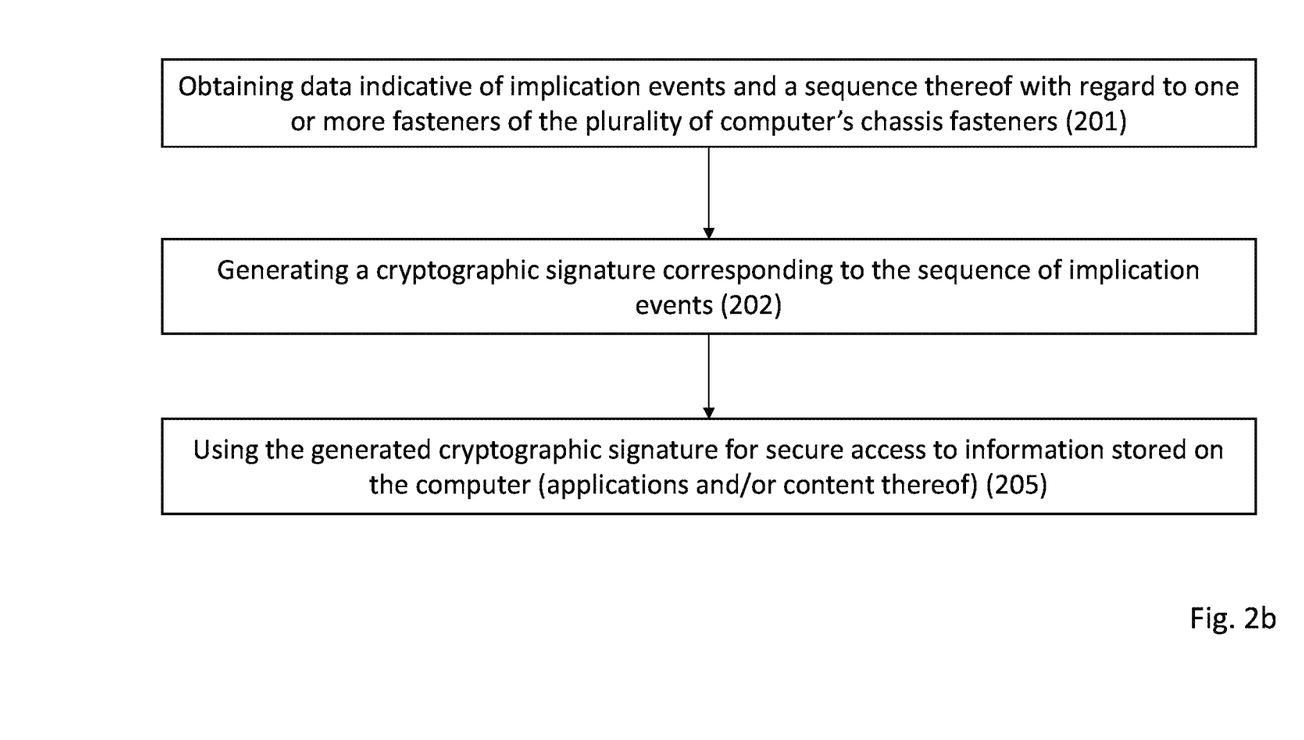
FIG. 2b illustrates a generalized flow-chart of alternative or additional operating the tamper-proofed computer in accordance with certain embodiments of the presently disclosed subject matter.

Referring to FIG. 2b, there is illustrated a generalized flow-chart of alternative or additional operating the tamper-proofed computer 100. In accordance with certain embodiments of the presently disclosed subject matter, security module 121 can use (205) the generated cryptographic signature for secure access to information stored on the computer thereby securing computer 100 against data tampering. By way of non-limiting example, security module 121 can use the cryptographic signature as a key for decoding a reference ciphertext stored therein. The properly decoded result can be used as a password (or part thereof) allowing access to a given application and/or data. Alternatively or additionally, the cryptographic signature can be used as a key for decoding an encrypted content of the application.

Optionally, operation (205) can be provided after operation (203) when the generated cryptographic signature matches the cryptographic reference. Optionally, security module 121 can generate different cryptographic signatures for operations (203) and (205). By way of non-limiting example, these signatures can differ by implicated fasteners considered in the sequence of implication events, techniques of generating a cryptographic signature corresponding to the sequence of implication events, etc.

Figure 3:
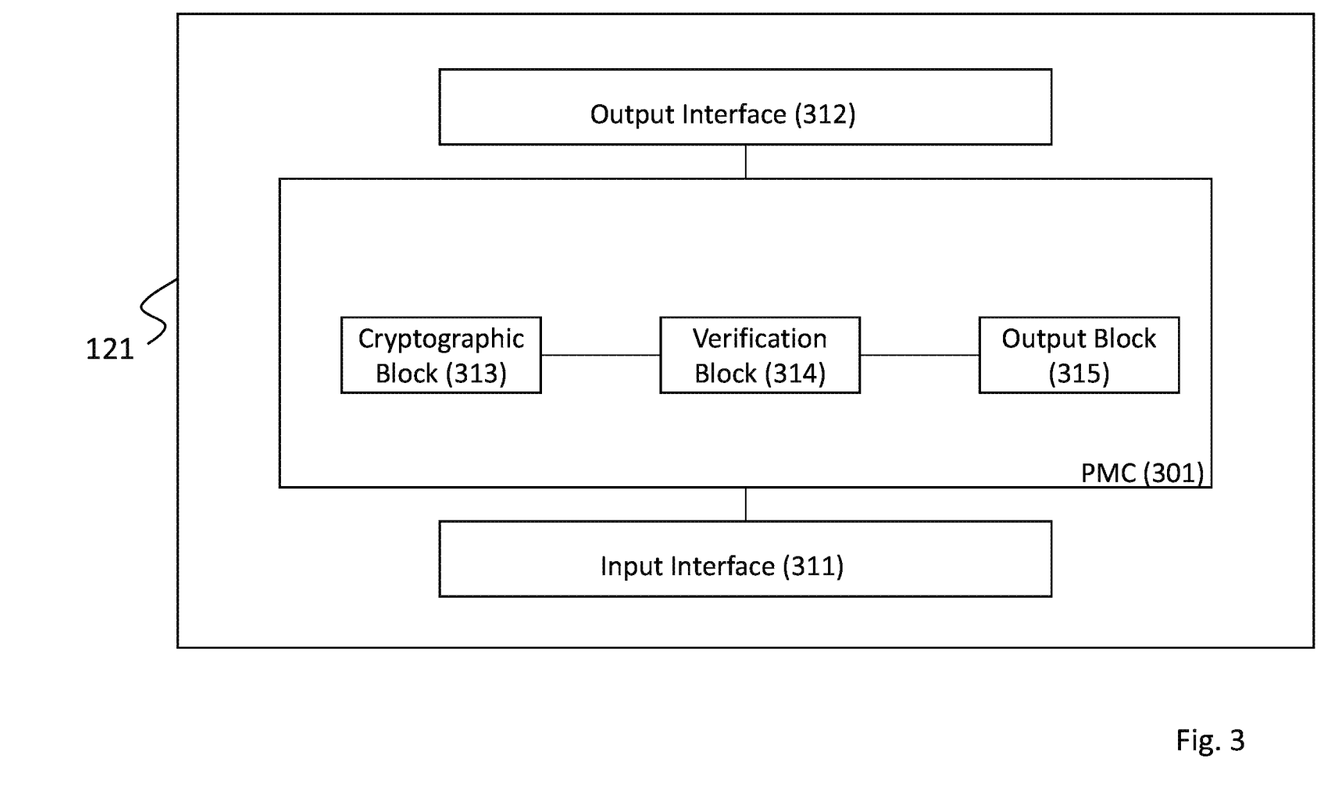
FIG. 3 illustrates a functional block diagram of a security module in accordance with certain embodiments of the presently disclosed subject matter.

Referring to FIG. 3, there is illustrated a functional block diagram of the security module in accordance with certain embodiments of the presently disclosed subject matter.

Security module 121 comprises a processor and memory circuitry (PMC) 301 operatively connected to a hardware-based input interface 311 configured to receive data from the plurality of sensors and to a hardware-based output interface 312 configured to transfer commands to the motherboard (and optionally, to disk(s), peripheral modules, wireless output, etc.). PMC 301 is configured to provide processing necessary for operating security module 121 as detailed above, and comprises a processor (not shown separately) and a memory (not shown separately). The processor of PMC 301 can be configured to execute several functional modules in accordance with computer-readable instructions implemented on a non-transitory computer-readable memory comprised in PMC 301. Such functional modules are referred to hereinafter as comprised in PMC 301. Functional modules comprised in PMC 301 can include cryptographic block 313, verification block 314 and output block 315. Cryptographic block 313 is configured to generate cryptographic signatures and cryptographic references as detailed above. Verification block 314 is configured to match between respective cryptographic signatures and cryptographic references and output block 315 is configured to initiate anti-tampering actions and/or secure access process as detailed above.

Security module 121 can further comprise a battery (not shown) enabling its operating when the power of computer 100 is removed. Optionally, security module 121 can be hardened to prevent easy access or dismantling.

Those skilled in the art will readily appreciate that the presently disclosed subject matter is not bound by the configuration of FIG. 3; equivalent and/or modified functionality can be consolidated or divided in another manner and can be implemented in any appropriate combination of software, firmware and hardware.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of proofing against a physical tampering with a computer comprising a chassis with a plurality of fasteners, the method comprising:
   a) obtaining, by the computer, data indicative of a sequence of implication events associated with the fasteners of the plurality of fasteners;
   b) generating, by the computer, a pattern corresponding to the sequence of implication events;
   c) matching, by the computer, between data corresponding to the generated pattern and a stored reference data;
   d) responsive to identifying, based on the matching, a successful matching result indicative of an authorized opening of the chassis, enabling authorized opening of the chassis; and e) responsive to identifying, based on the matching, a mismatching result indicative of an unauthorized opening of the chassis, initiating, by the computer, one or more anti-tampering actions.

2. The method of claim 1, wherein each fastener of the plurality of fasteners is associated with a value, and the pattern is generated as a string of values corresponding to the sequence of implication events associated with the respective fasteners.

3. The method of claim 2, wherein at least two fasteners and implication events associated therewith are defined as being equivalent and wherein the sequences with exchanged places of equivalent implication events are defined as belonging to the same pattern with equivalent fasteners associated with equal values.

4. The method of claim 1, further comprising generating a cryptographic signature corresponding to the generated pattern, wherein matching between data corresponding to the generated pattern and the reference data comprises matching the generated cryptographic signature to a cryptographic reference corresponding to the reference data.

5. The method of claim 4, wherein the cryptographic signature is generated by applying a hash function to the generated pattern and the cryptographic reference is generated by applying the same hash function to a reference pattern pre-defined for the computer; and wherein matching therebetween comprises comparing the resulting cryptographic signature and the cryptographic reference.

6. The method of claim 5 further comprising randomly selecting the hash function to be applied to the generated pattern and to the reference pattern.

7. The method of claim 4, wherein matching the generated cryptographic signature to the cryptographic reference comprises using the cryptographic signature as a key for decoding a ciphertext stored in the computer, and wherein the matching is considered as successful when a result of decoding corresponds to a predefined unique ID associated with the computer.

8. The method of claim 1, wherein matching between data corresponding to the generated pattern and the reference data is initiated responsive to a first implication event.

9. The method of claim 1, further comprising repeating operations c), d), and e) responsive to a predefined number of next occurred implication events.

10. The method of claim 1, wherein the one or more anti-tampering actions are selected from a group consisting of:
providing a sound alert;
sending alert to a dedicated entity;
initiating a request for a user's authorization;
providing data destructing operations resulting in encrypting at least part of data stored in the computer;
providing data destructing operations resulting in erasing at least part of data stored in the computer;
providing data destructing operations resulting in destroying encryption keys stored in the computer; and
providing hardware destructing operations.

11. The method of claim 1, wherein one or more anti-tampering actions are selected depending on a number of properly removed fasteners prior to the identified mismatch.

12. A computer comprising a chassis with a plurality of fasteners, a plurality of sensors operatively connected to the fasteners and a security circuitry, wherein:
each given fastener of the plurality of fasteners is associated with a sensor of the plurality of sensors, the sensor configured to enable detecting a condition of the given fastener and to forward data indicative of the conditions and/or changes thereof to the security circuitry;
the security circuitry is configured to:
use data received from the sensors of the plurality of sensors to obtain data indicative of a sequence of implication events associated with the fasteners of the plurality of fasteners;
generate a pattern corresponding to the sequence of implication events;
match between data corresponding to the generated pattern and a stored reference data;
responsive to identifying, based on the matching, a successful matching result indicative of an authorized opening of the chassis, to enable authorized opening of the chassis; and
responsive to identifying, based on the matching, a mismatching result indicative of an unauthorized opening of the chassis, to initiate one or more anti-tampering actions.

13. The computer of claim 12, wherein the plurality of fasteners comprises at least one first fastener configured to forward data indicative of the degree of removing thereof and at least one second fastener configured to forward only data indicative of full removal thereof.

14. The computer of claim 12, wherein each fastener of the plurality of fasteners is associated with a value, and wherein the security circuitry is configured to generate the pattern as a string of values corresponding to the sequence of implication events associated with the respective fasteners.

15. The computer of claim 12, wherein at least two fasteners and implication events associated therewith are defined as being equivalent and wherein the sequences with exchanged places of equivalent implication events are defined as belonging to the same pattern with equivalent fasteners associated with equal values.

16. The computer of claim 12, wherein the security circuitry is further configured to generate a cryptographic signature corresponding to the generated pattern, wherein matching between data corresponding to the generated pattern and the reference data comprises matching the generated cryptographic signature to a cryptographic reference corresponding to the reference data.

17. The computer of claim 16, wherein the security circuitry is configured to generate the cryptographic signature by applying a hash function to the generated pattern and to generate the cryptographic reference by applying the same hash function to a reference pattern pre-defined for the computer; and wherein matching therebetween comprises comparing the resulting cryptographic signature and the cryptographic reference.

18. The computer of claim 17, wherein the security circuitry is further configured to randomly select the hash function to be applied to the generated pattern and to the reference pattern.

19. The computer of claim 16, wherein the security circuitry is further configured to match the generated cryptographic signature to the cryptographic reference using the cryptographic signature as a key for decoding a ciphertext stored in the computer, and wherein the matching is considered as successful when a result of decoding corresponds to a predefined unique ID associated with the computer.

20. The computer of claim 12, wherein the one or more anti-tampering actions are selected from a group consisting of:
providing a sound alert;
sending alert to a dedicated entity;
initiating a request for a user's authorization;
providing data destructing operations resulting in encrypting at least part of data stored in the computer;
providing data destructing operations resulting in erasing at least part of data stored in the computer;
providing data destructing operations resulting in destroying encryption keys stored in the computer; and
providing hardware destructing operations.

21. A security circuitry configured to operate in conjunction with a computer comprising a chassis with a plurality of fasteners and a plurality of sensors, each given fastener of the plurality of fasteners associated with a sensor of the plurality of sensors, the sensor configured to enable detecting a condition of the given fastener and to forward data indicative of the conditions and/or changes thereof to the security circuitry; the security circuitry is configured to:
use data received from the sensors of the plurality of sensors to obtain data indicative of a sequence of implication events associated with the fasteners of the plurality of fasteners;
generate a pattern corresponding to the sequence of implication events;
match between data corresponding to the generated pattern and a stored reference data;
responsive to identifying, based on the match, a successful matching result indicative of an authorized opening of the chassis, enable authorized opening of the chassis; and
responsive to identifying, based on the match, a mismatching result indicative of an unauthorized opening of the chassis, initiate one or more anti-tampering actions.

22. The method of claim 4, wherein the generated cryptographic signature is used for secure access to information stored on the computer.

23. The method of claim 1, further comprising updating the stored reference data.

24. The method of claim 1, wherein each of the implication events bears a time stamp, and wherein the sequence is identified based on the time stamps.

25. The method of claim 1, wherein the implication events in the sequence are ordered in a data queue, and wherein the pattern is generated based on the order of implication events in the data queue.

* * * * *